US012612274B2

(12) United States Patent
Someya

(10) Patent No.: US 12,612,274 B2
(45) Date of Patent: Apr. 28, 2026

(54) PLOTTER

(71) Applicant: SILHOUETTE JAPAN CORPORATION, Yokohama (JP)

(72) Inventor: Hironari Someya, Yokohama (JP)

(73) Assignee: SILHOUETTE JAPAN CORPORATION, Yokohama (JP)

( * ) Notice: Subject to any disclaimer, the term of this patent is extended or adjusted under 35 U.S.C. 154(b) by 0 days.

(21) Appl. No.: 18/918,737

(22) Filed: Oct. 17, 2024

(65) Prior Publication Data

US 2025/0128900 A1 Apr. 24, 2025

(30) Foreign Application Priority Data

Oct. 18, 2023 (JP) ................................. 2023-179456

(51) Int. Cl.

*B65H 5/06* (2006.01)
*B26D 1/04* (2006.01)
*B41J 13/02* (2006.01)
*B65H 5/36* (2006.01)

(52) U.S. Cl.

CPC ............... *B65H 5/36* (2013.01); *B26D 1/045* (2013.01); *B65H 5/06* (2013.01); *B65H 2301/44324* (2013.01); *B65H 2402/54* (2013.01); *B65H 2402/60* (2013.01); *B65H 2801/36* (2013.01)

(58) Field of Classification Search

CPC .......... B41J 13/02; B41J 13/025; B41J 13/03; B65H 5/06; B65H 5/062; B65H 2404/1523; B65H 2404/144; B65H 2402/54; B65H 2402/60; B65H 2801/36; B26D 1/045; B26D 1/45; B62D 7/025; B62D 7/06

See application file for complete search history.

(56) References Cited

U.S. PATENT DOCUMENTS

2020/0171858 A1 6/2020 Igarashi

FOREIGN PATENT DOCUMENTS

JP 2001302013 A * 10/2001
JP 6383196 B2 8/2018

OTHER PUBLICATIONS

European Search Report and Search Opinion received for EP Patent Application No. 24206448.3, mailed on Mar. 5, 2025, 9 pages.

* cited by examiner

*Primary Examiner* — Luis A Gonzalez
(74) *Attorney, Agent, or Firm* — WOMBLE BOND DICKINSON (US) LLP

(57) ABSTRACT

The plotter comprises an assist roller including a rotating body for pressing a medium against a work stage. The assist roller is configured to be attachable to and detachable from a rail. The assist roller is configured to be movable in only a longitudinal direction of the rail while being mounted on the rail.

6 Claims, 20 Drawing Sheets

PLOTTER

TECHNICAL FIELD

The present invention relates to a plotter comprising an assist roller for pressing a medium against a work stage.

BACKGROUND ART

JP 6383196 B (document 1) discloses a plotter including an assist roller. The plotter includes a drive roller and a pinch roller for conveying a sheet-shaped to-be-cut medium on a work stage. The medium is conveyed by rotation of the drive roller and the pinch roller while the medium is sandwiched by the drive roller and the pinch roller. The pinch roller is mounted on a rotation shaft arranged in parallel with the drive roller, and is arranged on an end side of the rotation shaft so as to sandwich both ends of the medium in the width direction together with the drive roller. The rotation shaft is configured to be rotatable and extends from one side of the work stage to the other side.

Two assist rollers are provided on the central side of the rotation shaft in the axial direction to press the medium against the work stage. The assist roller includes: a cylindrical portion which is formed by a linear spring material and which is would in a cylindrical shape and through which the rotary shaft passes; and a spiral portion which connects both ends of the cylindrical portion to the rotary shaft. The spiral part is fixed to the rotary shaft.

In the plotter disclosed in document 1, the pinch roller may interfere with the assist roller when the width of the medium is narrow and the pinch roller is moved toward the center in order to press both ends of the medium. Moreover, since the range in which the medium can be pressed by the assist roller is limited, a part of the medium may rise upward from the work stage when the width of the medium is wide.

SUMMARY OF THE INVENTION

The present invention aims to provide a plotter in which the assist roller does not interfere with the pinch roller and in which the effect of pressing the medium against the work stage is sufficiently obtained.

An aspect of the present invention concerns a plotter comprising: a work stage on which a medium is placed; a feed mechanism configured to convey the medium on the work stage in a conveyance direction; a pen carriage configured to move above the work stage in a first direction which is orthogonal to the conveyance direction and which is parallel to a horizontal direction; a rail which is arranged upstream of the pen carriage in the conveyance direction and which extends in the first direction; and an assist roller including a rotating body configured to press the medium against the work stage, the assist roller configured to be attachable to and detachable from the rail and configured to be movable in the first direction when attached to the rail.

DETAILED DESCRIPTION OF THE INVENTION

Hereinafter, a plotter according to an embodiment of the present invention will be described in detail with reference to FIGS. 1-19.

Figure 1:
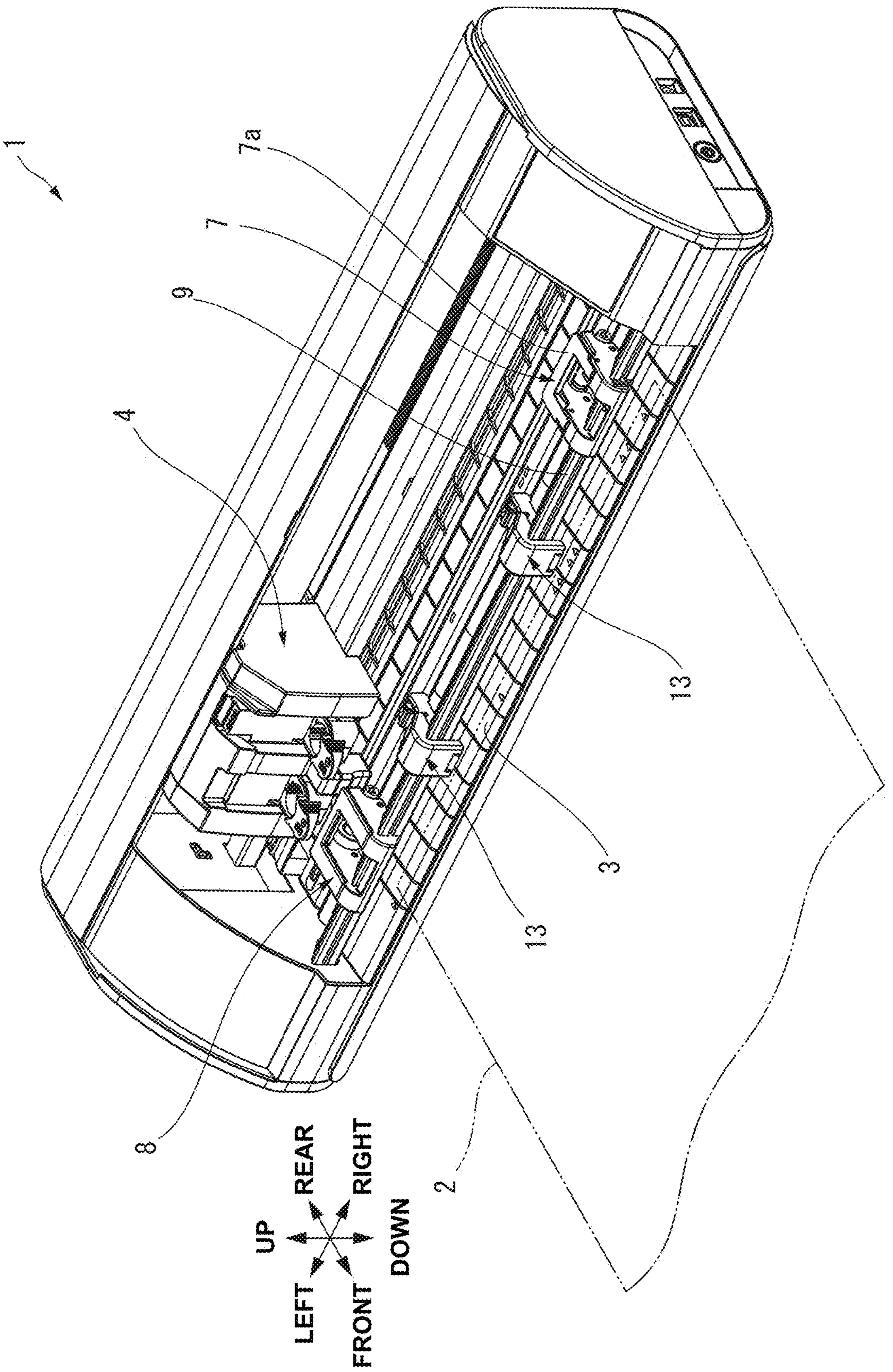
FIG. 1 shows a perspective view of a plotter according to an embodiment of the present invention.

The plotter 1 shown in FIG. 1 is for cutting out figures and characters from a sheet-shaped to-be-cut medium 2 (hereinafter simply referred to as the "medium 2"). The plotter 1 includes a work stage 3 on which the medium 2 is conveyed and a pen carriage 4 for supporting cutting pens not illustrated. The medium 2 may be a single sheet, a rolled sheet, etc.

Work Stage and Pen Carriage

The work stage 3 is formed so as to extend in a conveyance direction (a direction from lower left to upper right in FIG. 1) of the medium 2 and a first direction (a direction from upper left to lower right in FIG. 1) which intersects the conveyance direction and which is parallel to the horizontal direction. In the following, downstream of the medium 2 in the conveyance direction is referred to as the "rear side", and upstream of the medium 2 in the conveyance direction is referred to as the "front side". The first direction is referred to as the "left-right direction".

Figure 2:
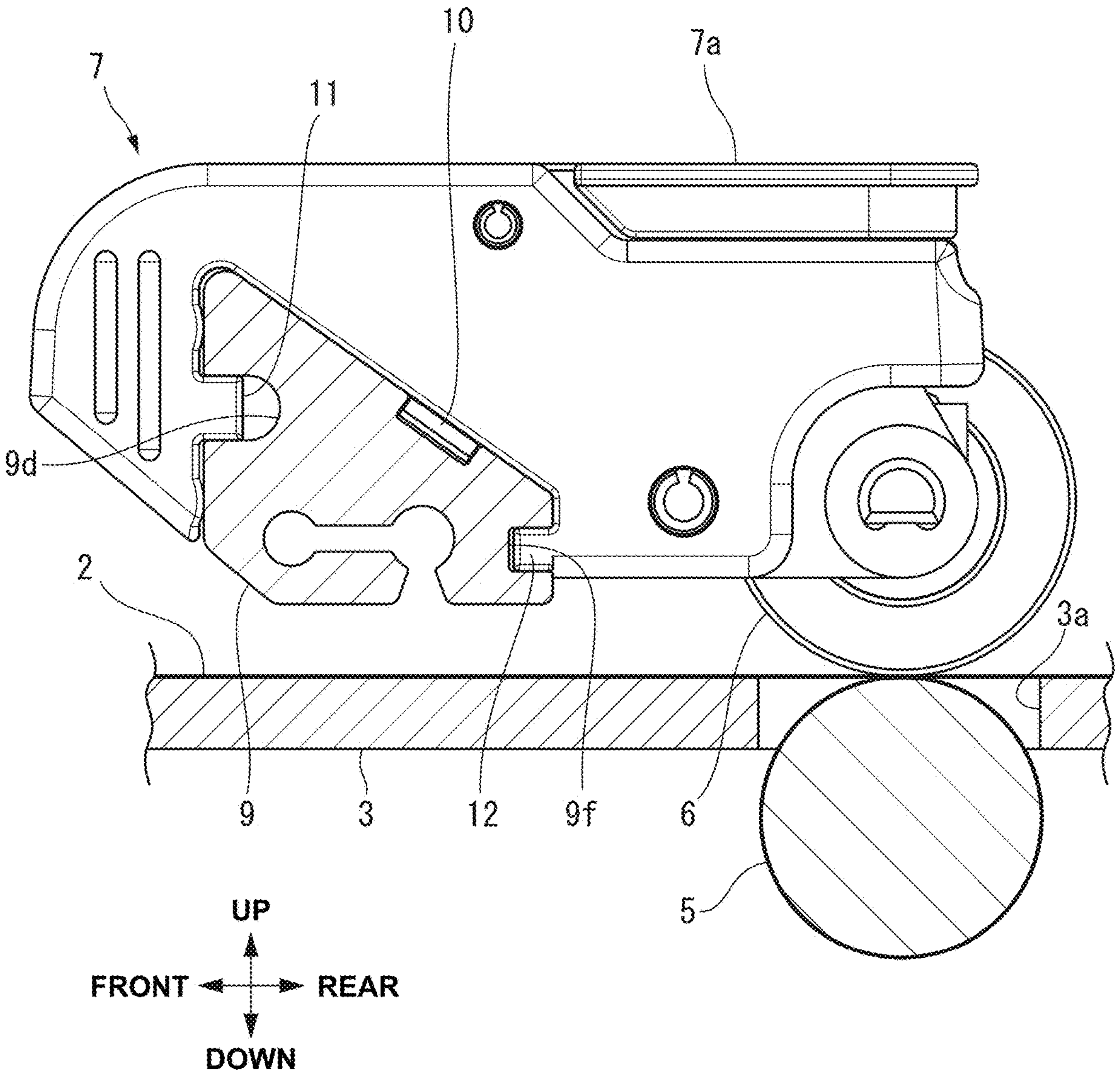
FIG. 2 shows a side view of a pinch roller unit.

The medium 2 is conveyed by rotating the medium driving roller 5 with the medium 2 on the work stage 3 being sandwiched between the medium driving roller 5 and the pinch roller 6, as shown in FIG. 2. A feed mechanism for conveying the medium 2 on the work stage 3 in the conveyance direction is configured by the medium driving roller 5 and the pinch roller 6.

The medium driving roller 5 is disposed under the work stage 3 and extends in the left-right direction. An opening 3*a* extending in the left-right direction is formed on the work stage 3, and the upper portion of the medium driving roller 5 protrudes from the opening 3*a* to the upper surface of the work stage 3. The opening 3*a* is formed on the front side of the pen carriage 4 described later. The medium driving roller 5 rotates such that the medium 2 pressed by the plurality of pinch rollers 6 described later is conveyed.

The pen carriage 4 has a function of driving the cutting pen (not illustrated) in the up-down direction. The pen carriage 4 is configured to be movable in the left-right direction above the work stage 3. The "up-down direction" herein is a vertical direction intersecting the work stage 3.

The medium 2 is cut by attaching a cutting pen to the pen carriage 4, rotating the medium driving roller 5 in a forward or reverse direction with the medium 2 being sandwiched between the medium driving roller 5 and the pinch roller 6, and piercing the cutting pen into the medium 2 and moving the cutting pen along with the pen carriage 4 in the left-right direction.

Pinch Roller

The plotter 1 includes a plurality of pinch rollers 6 configured to press the medium 2 against the medium driving roller 5. In this embodiment, the plotter 1 includes two pinch rollers 6. The two pinch rollers 6 are respectively provided in first and second pinch roller units 7 and 8, which are illustrated in two left and right parts in the vicinity of the work stage 3 in FIG. 1. The pinch roller units 7, 8 are supported by a rail 9 disposed on the front side of the pen carriage 4. Therefore, it can be said that the pinch roller 6 is supported by the rail 9.

The rail 9 extends in the left-right direction so as to extend from the left end to the right end of the work stage 3 in the upper vicinity of the work stage 3, and is fixed onto a frame (not illustrated) of the cutting plotter at both left and right ends.

The pinch roller units 7 and 8 are supported by the rail 9 movable in the left and right direction. The pinch roller 6 is supported by the rear end of the pinch roller units 7 and 8 movable in the up-down direction and rotatably. The pinch roller 6 is biased downward by the spring force of the spring member not illustrated. Therefore, the medium 2 is pressed against the medium driving roller 5 by the pinch roller 6 biased by the spring force of the spring member.

The first pinch roller unit 7 located on the right side in FIG. 1 includes an operation lever 7*a* swingably movable in the up-down direction, and is configured such that the pinch roller 6 moves in the up-down direction by the operation lever 7*a* swingably moving in the up-down direction around the front end. The first pinch roller unit 7 is freely movable along the rail 9 in the left-right direction when the pinch roller 6 has moved upwards. At least one of the plurality of pinch rollers 6 may be supported by the rail 9 movable in the left-right direction.

Rail

Figure 3:
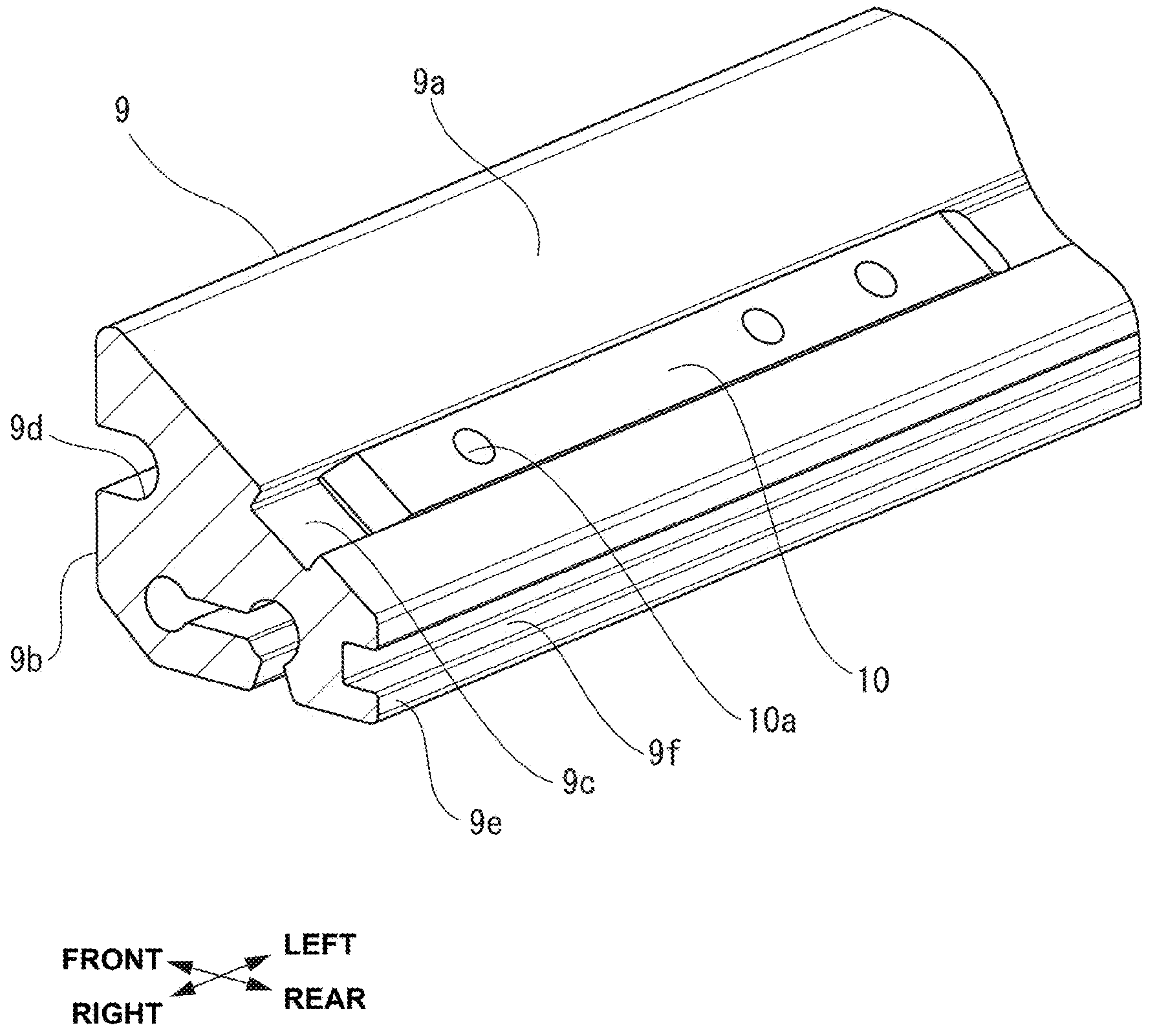
FIG. 3 shows a perspective cross-sectional view of a rail.
Figure 4:
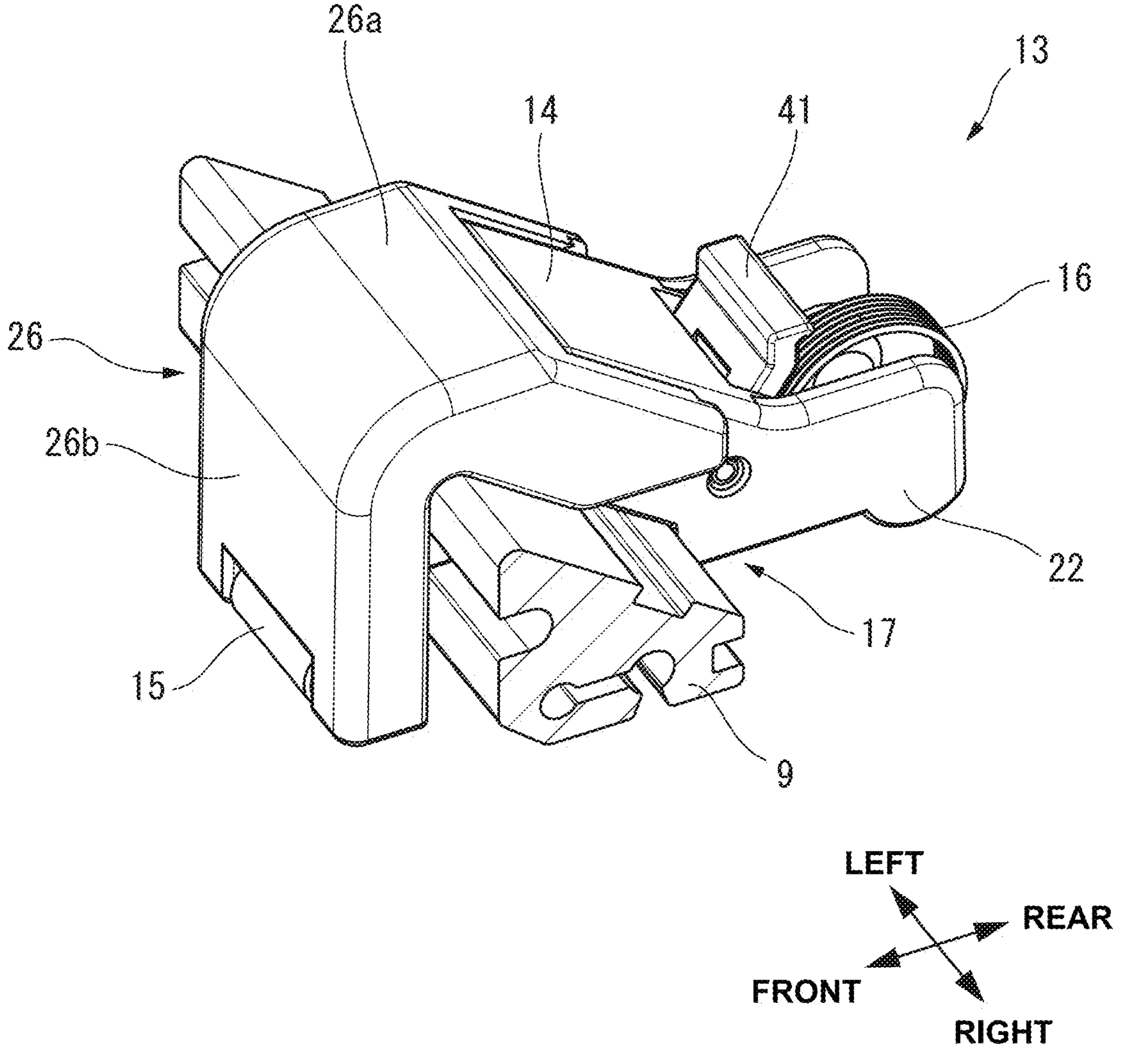
FIG. 4 shows a perspective view of an assist roller.

The rail 9 is formed by a drawn material having a predetermined cross-section. The rail 9 according to this embodiment is formed such that the cross-section is a substantially right triangle as shown in FIG. 3, and is used in a posture in which the inclined surface 9*a* faces rearwards upwards and the front surface 9*b* extends in the up-down direction. A first groove 9*c* extending in the left-right direction is formed on the inclined surface 9*a* of the rail 9, and a second groove 9*d* extending in the left-right direction is formed on the front surface 9*b*. A rear surface 9*e* and a third groove 9*f*, which extend in the left-right direction, are formed on the rear end of the rail 9. The rear surface 9*e* is formed to be parallel to the front surface 9*b*. In this embodiment, the "left-right direction" is synonymous with the longitudinal direction of the rail 9.

A plate-shaped member 10 used to position the first pinch roller unit 7 in the left-right direction is attached to the first groove 9*c*. A plurality of recesses 10*a* are formed on the upper surface of the plate-shaped member 10. The plurality of recesses 10*a* are respectively formed on a plurality of positions arranged at predetermined intervals in the left-right direction. The first pinch roller unit 7 is configured so that a part of the first pinch roller unit 7 fits into the recess 10*a* and the pinch roller 6 is positioned in an optimal position on the medium 2 when a standard-based medium 2 is used.

The second groove 9*d* and the third groove 9*f* engage with first and second engagement members 11 and 12, respectively, provided on the first pinch roller unit 7, as shown in FIG. 2. The first and second engagement members 11 and 12 engage with the second and third grooves 9*d* and 9*f*, thereby preventing the first pinch roller unit 7 from disengaging upwardly with respect to the rail 9. Although not illustrated in detail, the second pinch roller unit 8 is also prevented from disengaging by engaging with the rail 9 similarly to the first pinch roller unit 7.

Assist Roller

As shown in FIG. 1, there are two assist rollers 13 (assist roller mechanisms) on the rail 9 so as to be located between the first pinch roller unit 7 and the second pinch roller unit 8. The assist rollers 13 are for pressing the medium 2 against the work stage 3 between the first pinch roller unit 7 and the second pinch roller unit 8.

The assist roller 13 is configured as a single assembly by assembling various functional parts on the slider 14 which is supported by the rail 9 and which protrudes rearward of the rail 9, as shown in FIGS. 4-7.

The assist roller 13 includes a front roller 15 (second roller) located at the front end and a rear roller 16 (first roller) located at the rear end. The assist roller 13 is supported by the rail 9 so as to be attachable to and detachable from the rail 9 by a sliding mechanism 17 described later and movable in only the longitudinal direction (left-right direction) of the rail 9 when mounted on the rail 9. The front roller 15 and the rear roller 16 constitute rotating bodies for pressing the medium 2 against the work stage 3. The front roller 15 and the rear roller 16 will be described later.

Figure 8:
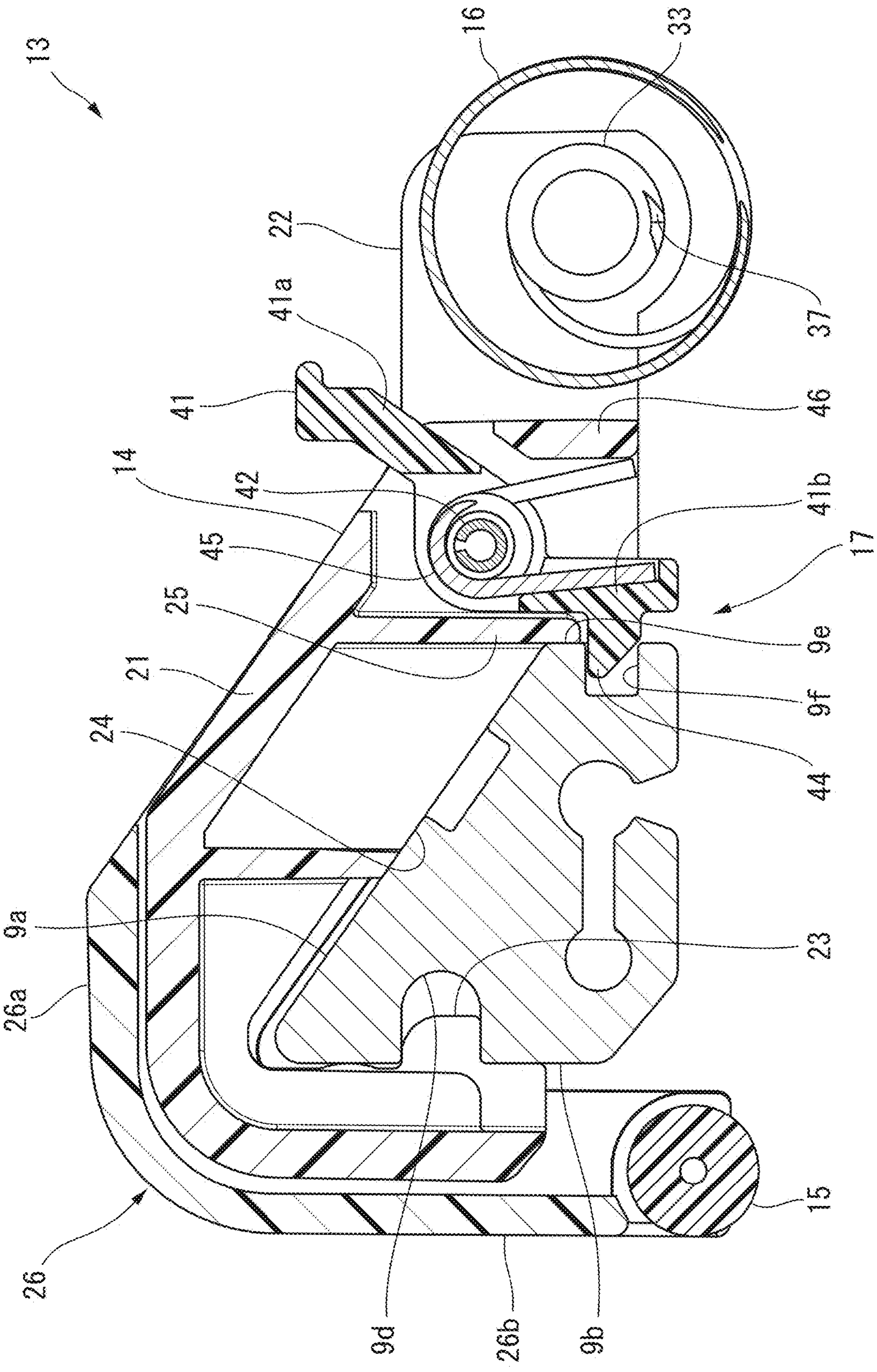
FIG. 8 shows a cross-sectional view along VIII-VIII line in FIG. 7.
Figure 9:
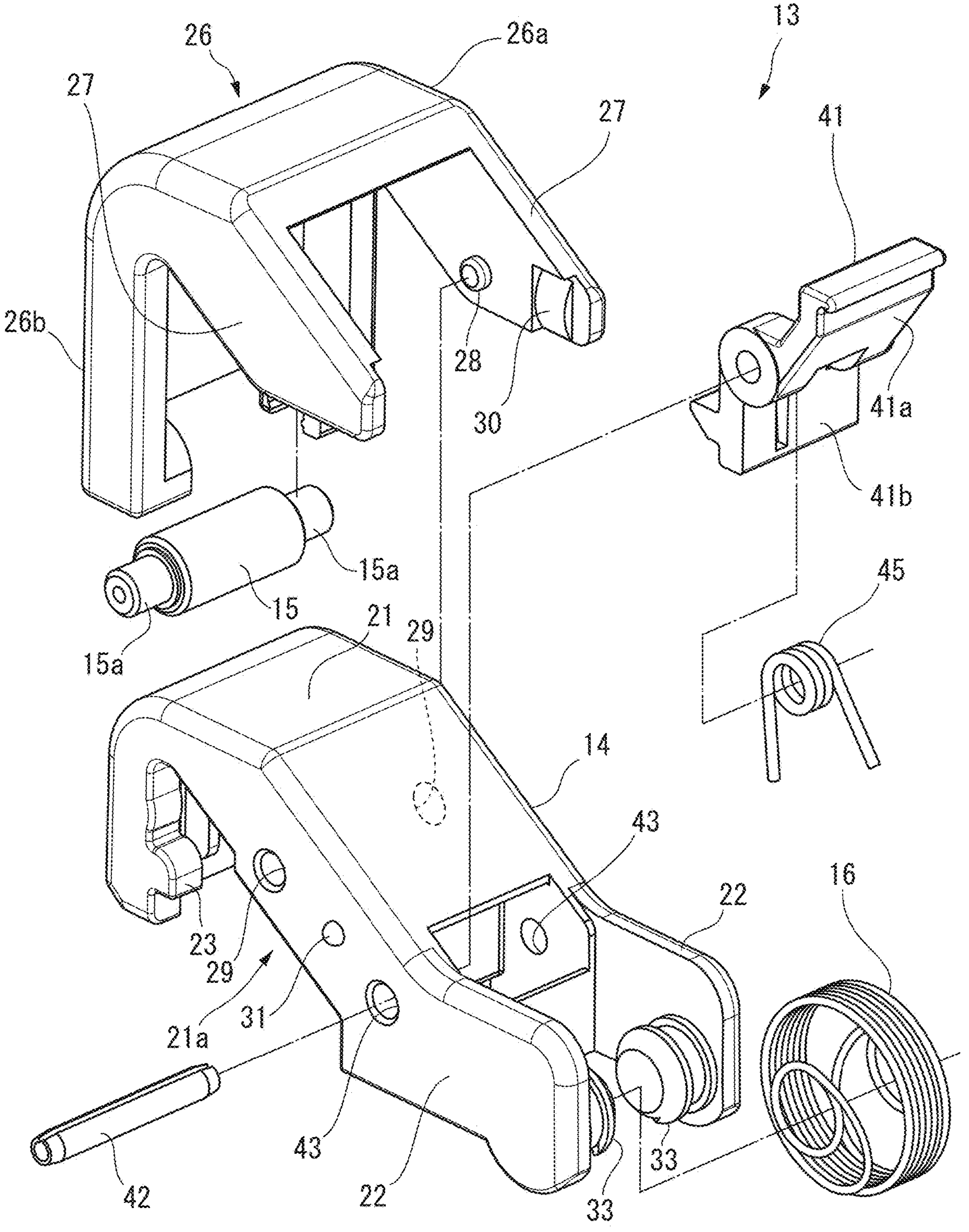
FIG. 9 shows an exploded perspective view of the assist roller.

When viewed from above, the slider 14 is formed so as to transverse the rail 9 in the front-rear direction. In detail, the slider 14 includes a holding portion 21 in which the upper portion of the rail 9 fits, and a pair of left and right arm portions 22 protruding rearward from the holding portion 21, as shown in FIGS. 8 and 9. The holding portion 21 constitutes a part of the sliding mechanism 17 described later. The holding portion 21 includes: a protrusion 23 that engages with the second groove 9*d* of the rail 9 from the front; an inclined surface 24 that contacts an inclined surface 9*a* of the rail 9 from above; and a longitudinal wall 25 that contacts the rear surface 9*e* of the rail 9 from rearward. The holding portion 21 is formed in a shape bent along the inclined surface 9*a* and the front surface 9*b* of the rail 9. The slider 14 is formed of an elastically deformable plastic material.

The side of the holding portion 21 has a substantially U shape, which corresponds to the shape of the front surface 9*b*, the inclined surface 9*a*, and the rear surface 9*e* of the rail 9. The holding portion 21 is configured to hold the rail 9 from above, and has an opening 21*a* into which the rail 9 is inserted. The holding portion 21 is formed of an elastically deformable material, and the opening length of the opening portion 21*a* in the front-rear direction can be changed.

Figure 6:
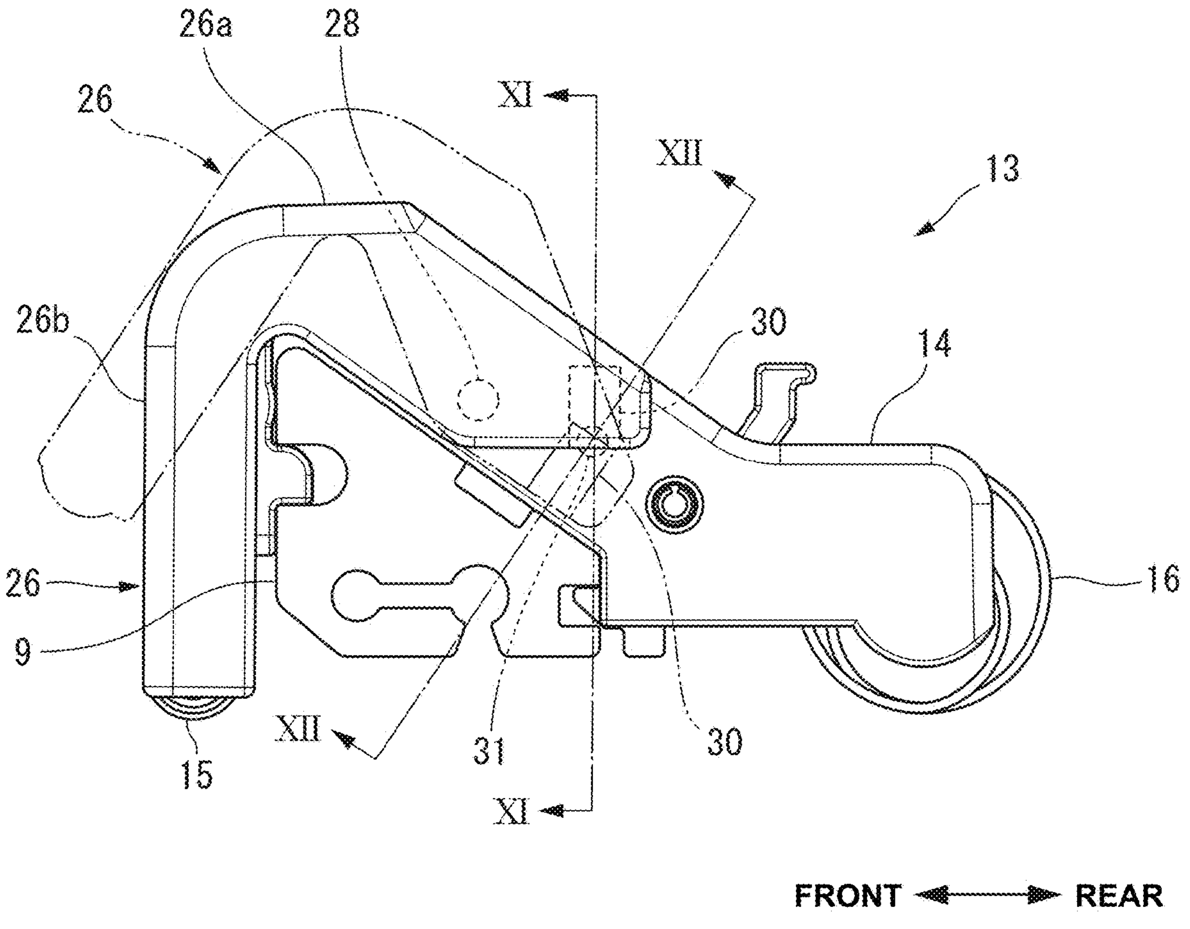
FIG. 6 shows a side view of the assist roller.

A pressing lever 26 for pressing the medium 2 against the work stage 3 is mounted on the front side of the slider 14. As shown in FIG. 6, the pressing lever 26 includes: a lateral plate 26*a* extending above the rail 9 in the front-rear direction (the conveyance direction of the medium 2); and a vertical plate 26*b* extending in the up-down direction from an end of the lateral plate 26*a* on the front side of the rail 9 (upstream in the conveyance direction).

A cylinder-shaped front roller 15 is rotatably supported on the lower end portion of the vertical plate 26*b* of the pressing lever 26. As shown in FIG. 9, a shaft 15*a* extending in the left-right direction protrudes at both ends of the front roller 15 in the axial direction. This shaft 15*a* is rotatably supported by the bottom end of the pressing lever 26 by engaging with the bottom end from below.

As shown in FIG. 9, a pair of side walls 27 positioned so as to sandwich the slider 14 from both left and right sides are provided on the lateral plate 26*a* of the pressing lever 26. The side walls 27 extend from both left and right ends of the lateral plate 26*a* diagonally toward the lower rearward (in the opposite direction to the vertical plate 26*b*). A shaft 28 protruding toward the slider 14 is provided on the opposing sides of the side walls 27. The shaft 28 pivotably fits onto the shaft hole 29 formed on the slider 14. Therefore, the pressing lever 26 is supported by the slider 14 so as to be pivotable about one point (shaft 28) on each of the pair of side walls 27.

The pressing lever 26 swingably moves with respect to the slider 14 such that the vertical plate 26*b* moves in the up-down direction about the shaft 28. The upward movement of the vertical plate 26*b* as indicated by two-dotted dash lines in FIG. 6 causes a gap between the front end (front roller 15) of the assist roller 13 and the work stage 3 to widen, and facilitates the work of inserting the medium 2 into the initial position. Furthermore, it is possible to avoid interference of the front end of the assist roller 13 with an automatic sheet feeder when the automatic sheet feeder not illustrated is used.

Figure 10:
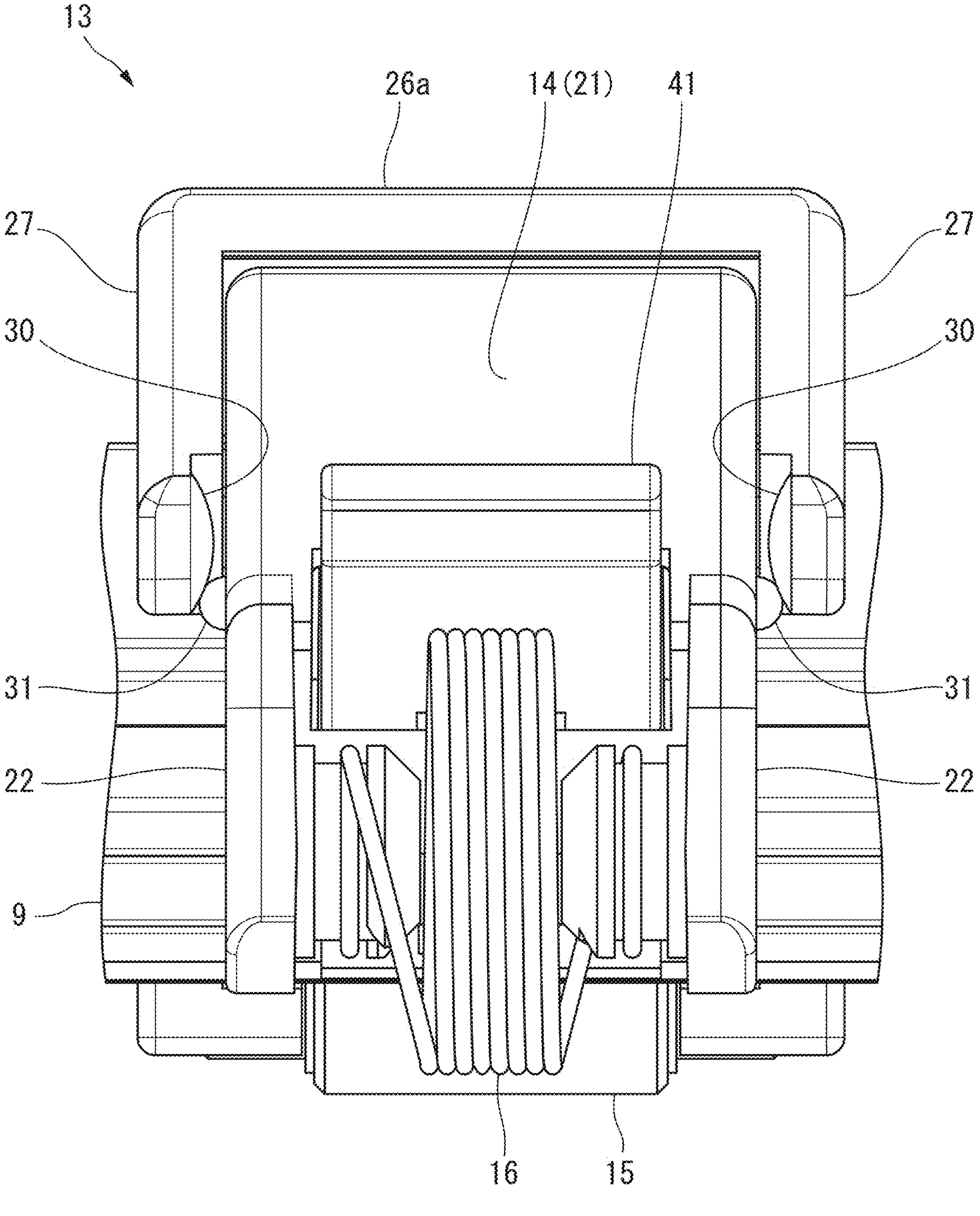
FIG. 10 shows a rear view of the assist roller.

As shown in FIG. 9, the rear end of the side wall 27 of the pressing lever 26 facing the slider 14 includes a truncated-cylinder shaped protrusion 30 which has an arc-shaped cross section and which extends in the front-rear direction. The truncated-cylinder shaped protrusion 30 is formed to have a shape which has an arc-shaped cross section and which is convex on the side of the slider 14 when viewed from the rear as shown in FIG. 10. A hemispherical protrusion 31 is formed on a position that faces the truncated-cylinder shaped protrusion 30 on the slider 14.

Figure 11:
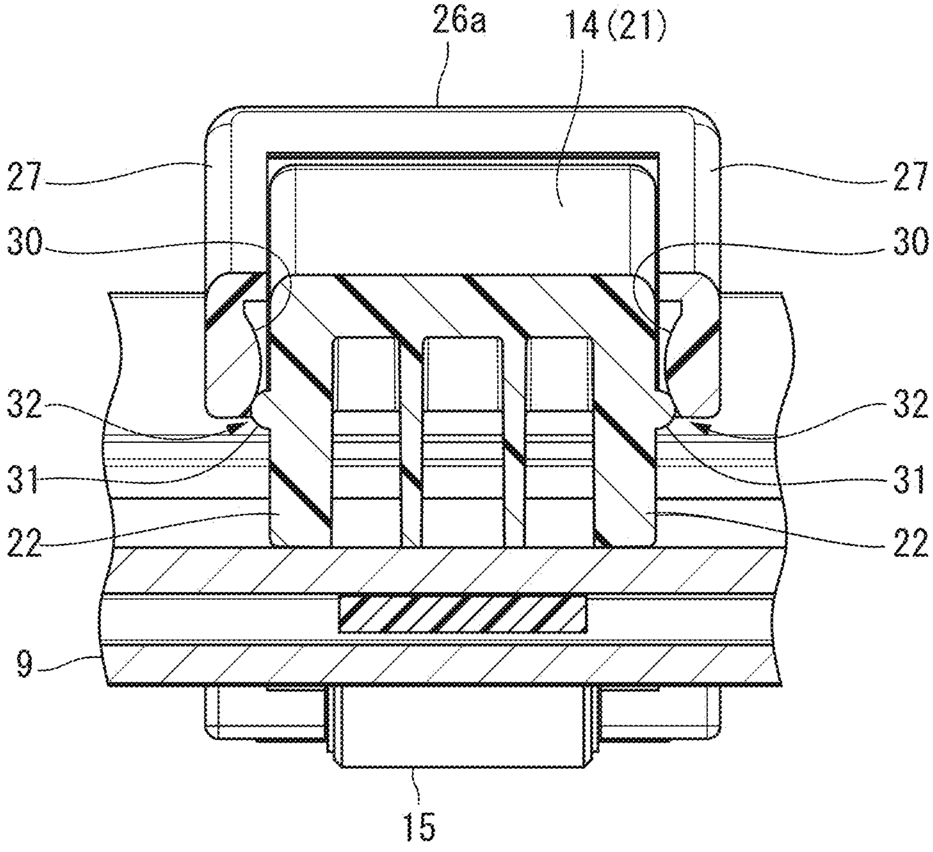
FIG. 11 shows a cross-sectional view along XI-XI line in FIG. 6.
Figure 12:
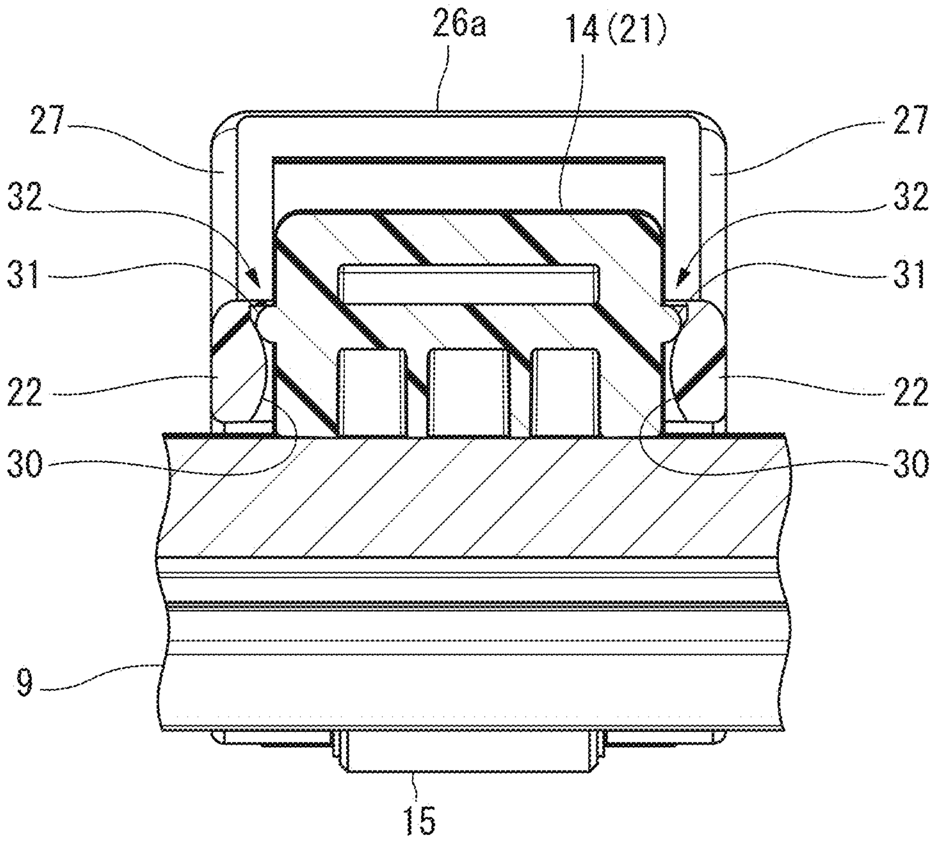
FIG. 12 shows a cross-sectional view along XII-XII line when the lever in FIG. 6 is moved upwards.

When the pressing lever 26 is located at a lower position indicated by solid lines in FIG. 6, the top of the truncated-cylinder shaped protrusion 30 is located above the hemispherical protrusion 31 as shown in FIG. 11. When the vertical plate 26*b* of the pressing lever 26 is raised upward from this position, the top of the truncated-cylinder shaped protrusion 30 moves downward beyond the hemispherical protrusion 31. When the pressing lever 26 is located at an upper position indicated by two-dotted dash lines in FIG. 6, the top of the truncated-cylinder shaped protrusion 30 is located below the hemispherical protrusion 31 as shown in FIG. 12. That is, the truncated-cylinder shaped protrusion 30 and the hemispherical protrusion 31 provide a sense of moderation to the worker when the pressing lever 26 is swung, and constitute a click mechanism 32 that holds the pressing lever 26 in the lower position or the upper position.

The pressing lever 26 is formed such that a convex curved surface of the truncated-cylinder shaped protrusion 30 is pressed against the hemispherical protrusion 31 by a predetermined pressing force when the pressing lever 26 is located at a lower position as shown in FIG. 11. Therefore, when the pressing lever 26 is positioned in the lower position, the pressing lever 26 is biased toward a direction (upward in FIG. 11) in which the top of the truncated-cylinder shaped protrusion 30 moves away from the hemispherical protrusion 31 by so-called principle of tilt cam. At this time, the pressing lever 26 is biased toward a direction in which the front roller 15 faces the work stage 3. As a result, in this assist roller 13, the front roller 15 presses the medium 2 against the work stage 3 without using a spring member.

Figure 7:
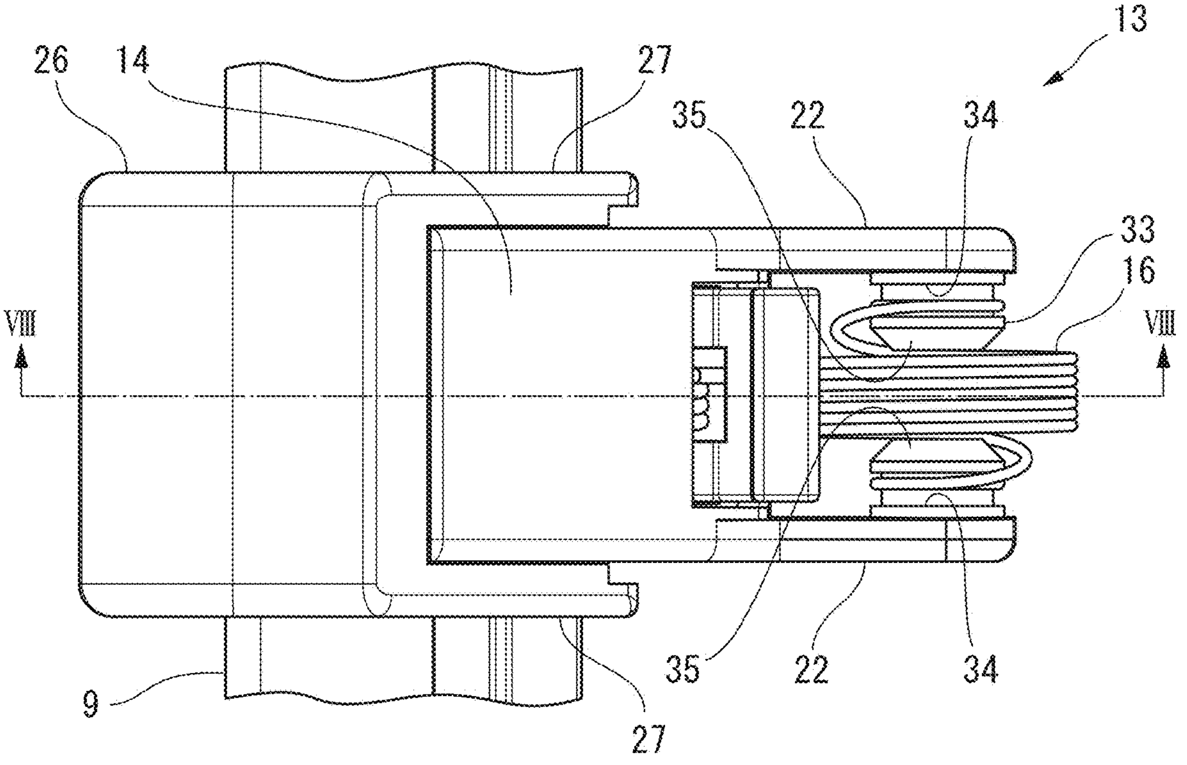
FIG. 7 shows a top view of the assist roller.
Figure 13:
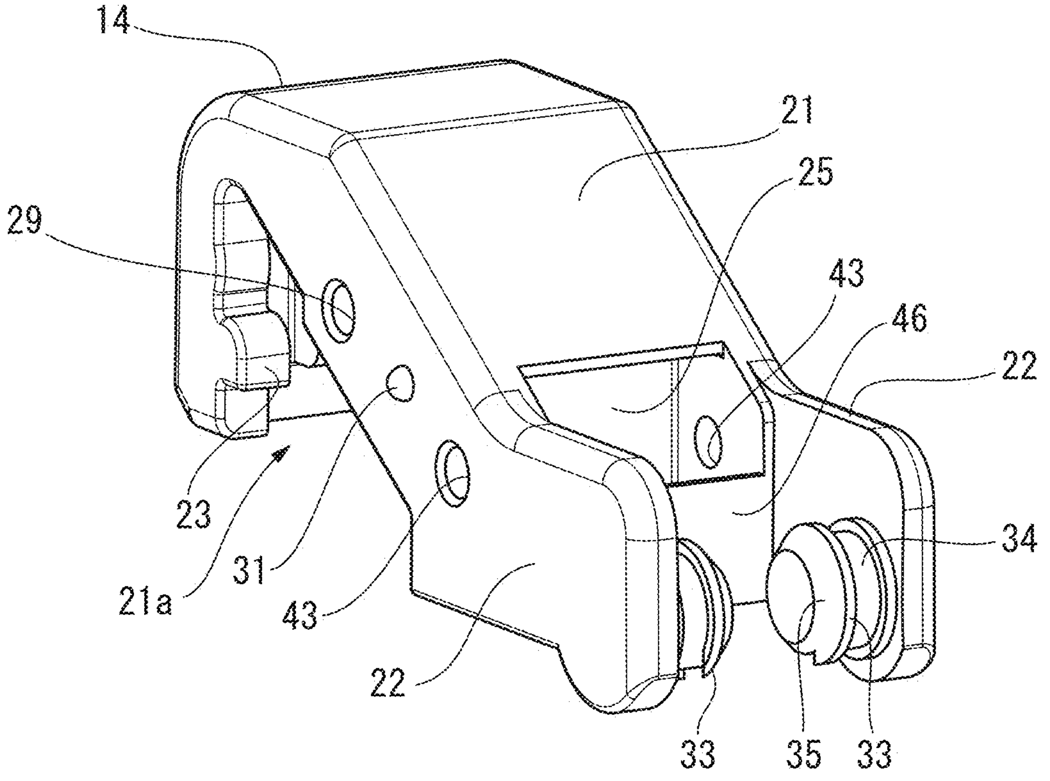
FIG. 13 shows a perspective view from diagonally above the slider.
Figure 14:
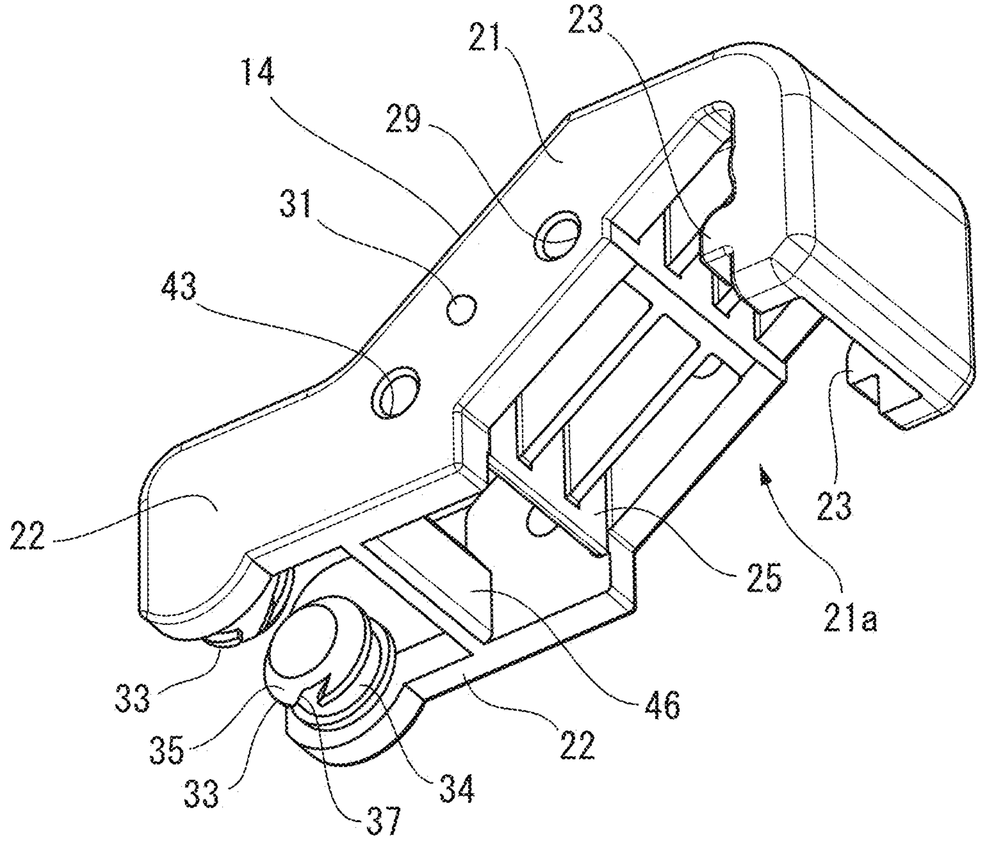
FIG. 14 shows a perspective view from diagonally below the slider.

As shown in FIG. 7, the pair of arm portions 22 of the slider 14 are formed to be arranged at predetermined intervals in the left-right direction. The front sides of the pair of arms 22 are connected to each other via a wall 46 extending in the left-right direction. A shaft 33 is provided on an inner surface which is on the rear end of one arm 22 and which faces the other arm 22 such that the shaft 33 protrudes toward the other arm 22. The shaft 33 is formed to have a cylindrical shape extending in the longitudinal direction of the rail 9 on the rear side (downstream side in the conveyance direction) of the rail 9. As shown in FIGS. 13 and 14, an annular groove 34 is formed on an intermediate portion of the shaft 33 in the axial direction. Furthermore, a tapered surface 35 is formed on the protruding end of the shaft 33 such that the outer diameter gradually decreases as it approaches the protruding end.

Figure 15A:
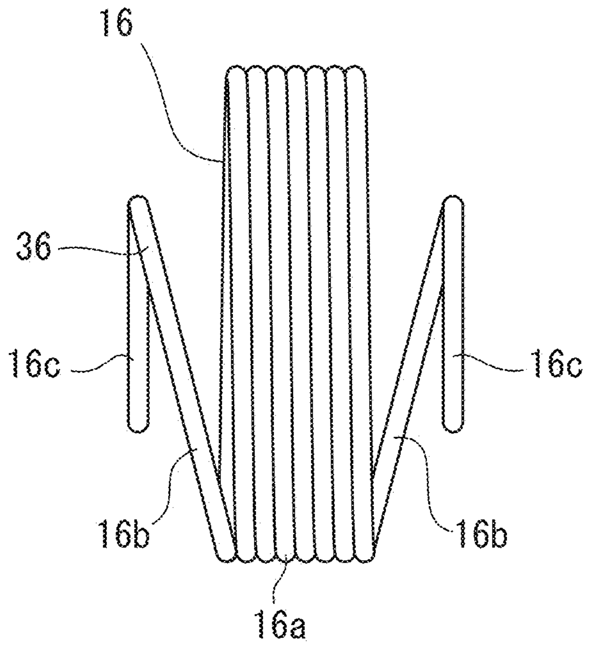
FIG. 15A shows a top view of the rear side roller.
Figure 15B:
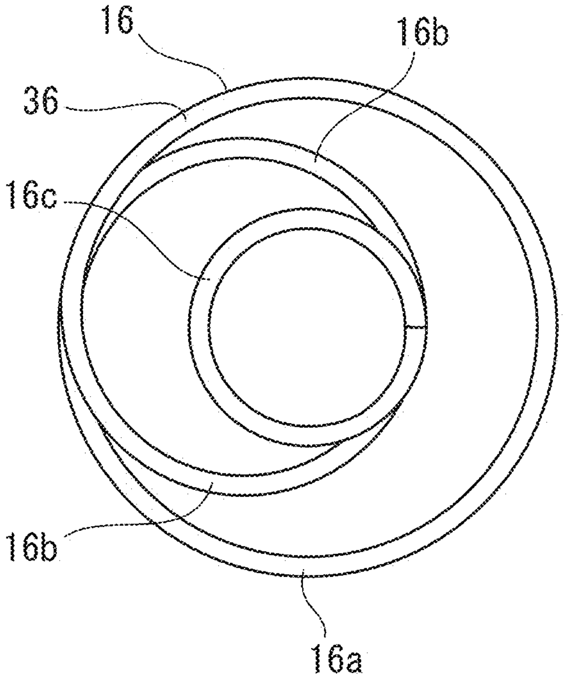
FIG. 15B shows a side view of the rear side roller.
Figure 15C:
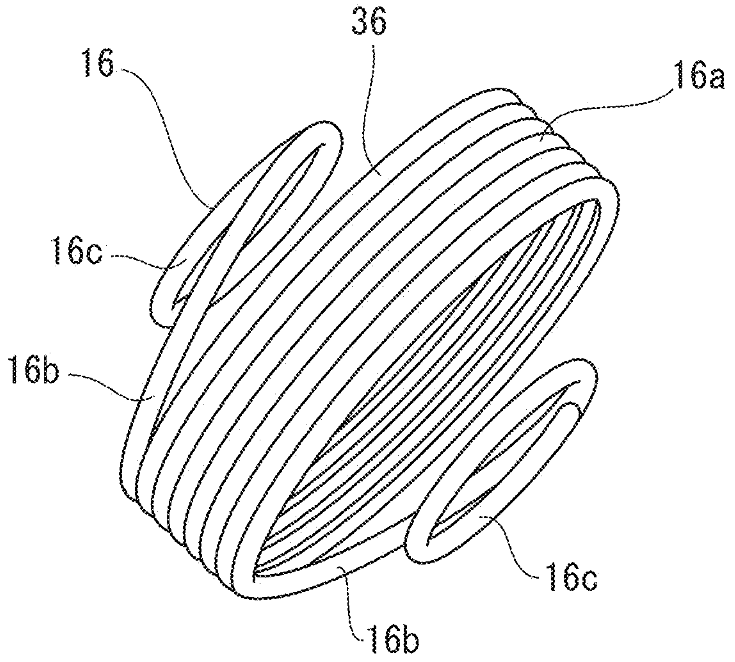
FIG. 15C shows a perspective view of the rear side roller.

A rear roller 16 is mounted on the shafts 33. The rear roller 16 is formed by winding a linear spring material 36 in a predetermined shape as shown in FIGS. 15A-15C. The rear roller 16 includes: a contact portion 16*a* formed to have a coil shape by the linear spring material 36; a pair of connecting portions 16*b* which are formed by the spring material 36 and which extend from both ends of the contact portion 16*a* in a direction away from the contact portion 16*a*; and a pair of shaft portions 16*c* connected to the contact portion 16*a* via the pair of connecting portions 16*b*.

The connecting portion 16*b* is formed to have a shape that forms a part of a helical spring. The shaft portion 16*c* is formed to have a shape of a ring that is located on the same axis as the contact portion 16*a* and is inserted into an annular groove 34 formed on the shaft 33 of the holding portion 21. The inner diameter of the shaft portion 16*c* is smaller than the outer diameter of the shaft 33 of the slider 14 and is slightly larger than the outer diameter of the bottom of the groove formed by a cylindrical surface of the annular groove 34 of the shaft 33, so that the shaft portion 16*c* inserted into the annular groove 34 is rotatable in the annular groove 34.

As shown in FIG. 14, a cutout 37 communicating inside and outside the annular groove 34 is formed on an open end of the shaft 33 for inserting the shaft portion 16*c* into the annular groove 34. By passing the open end of the spring material 36 constituting the shaft portion 16*c* through the cutout 37 and rotating the rear roller 16, and sequentially feeding the spring material 36 into the annular groove 34, the entire shaft portion 16*c* is guided into the annular groove 34. The shaft portions 16*c* at both ends of the rear roller 16 are accommodated in the annular grooves 34 of the shafts 33 on both sides, so that the rear roller 16 is rotatably supported by the shafts 33.

The rear roller 16 is configured such that the contact portion 16*a* is pressed against the work stage 3 while the slider 14 is attached to the rail 9, the connecting portion 16*b* is elastically deformed, and the contact portion 16*a* is displaced upward with respect to the shaft portion 16*c*. Accordingly, the medium 2 is sandwiched between the rear roller 16 and the work stage 3, and therefore the contact portion 16*a* presses the medium 2 against the work stage 3 by the spring force of the connecting portion 16*b*.

Figure 5:
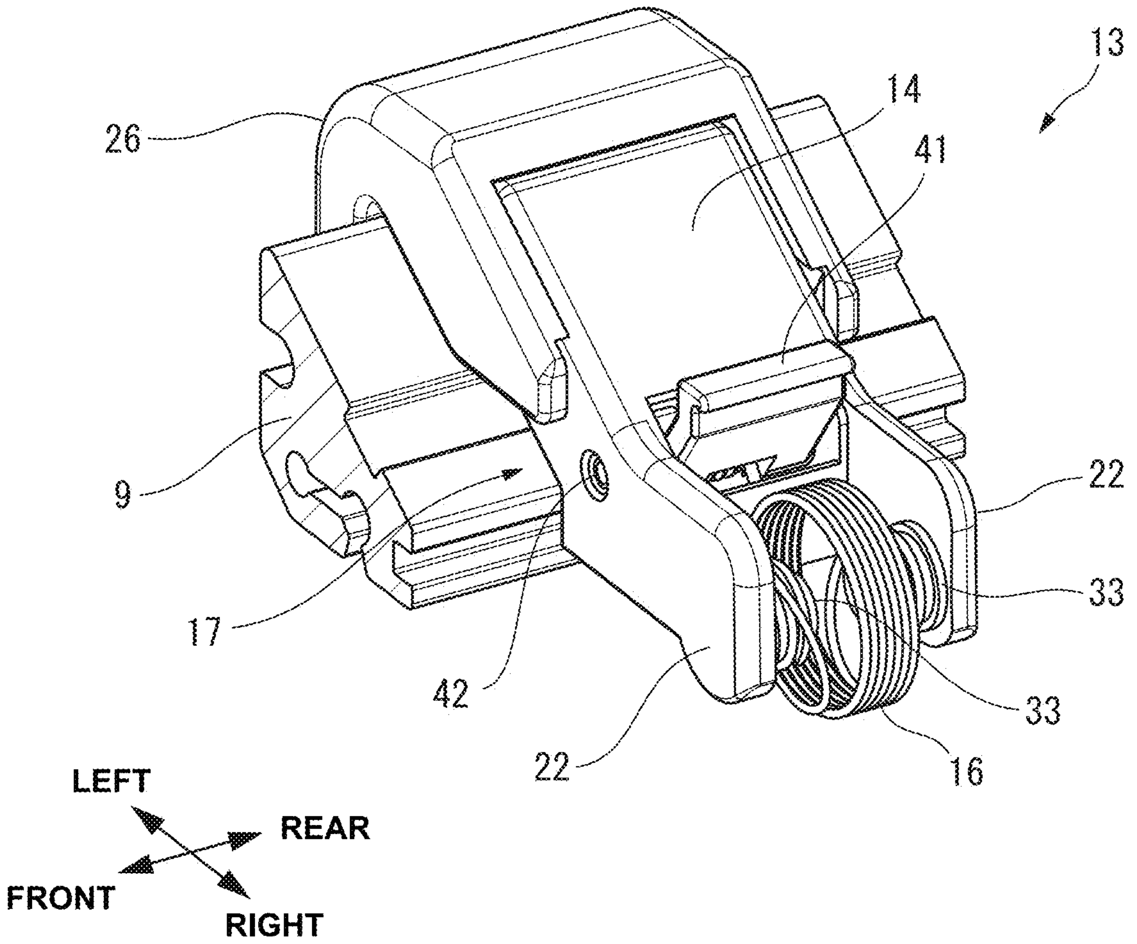
FIG. 5 shows a perspective view of the assist roller.
Figure 16:
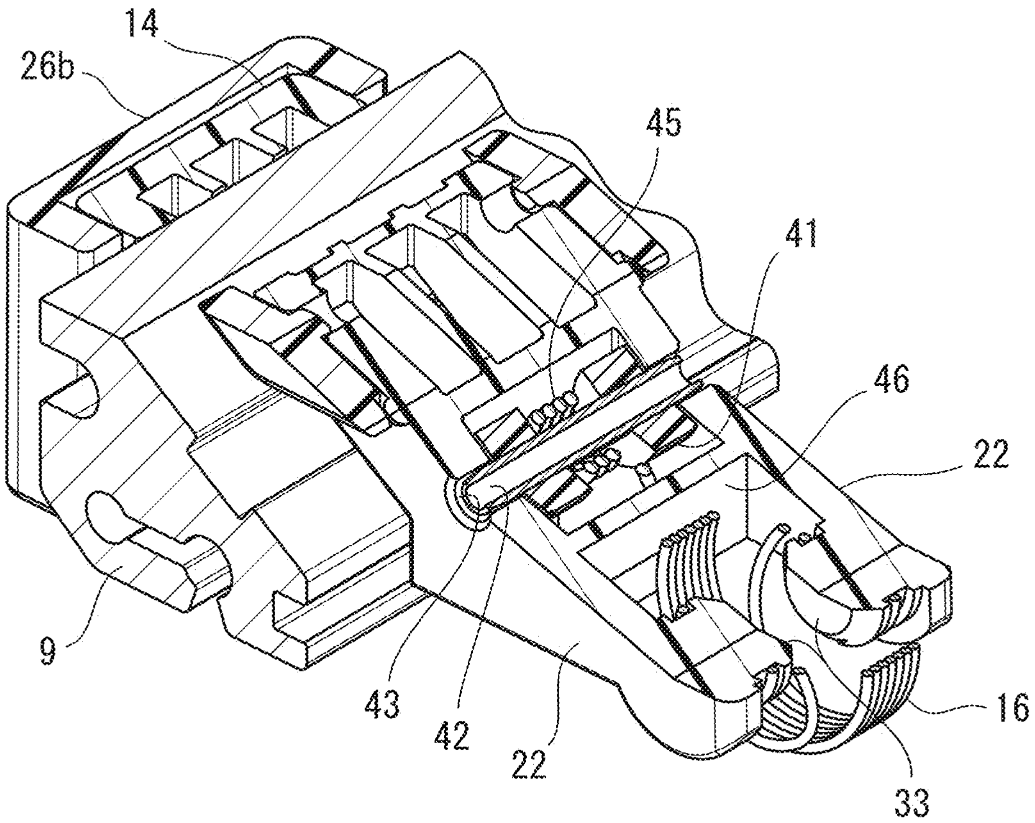
FIG. 16 shows a perspective cross-sectional view of the assist roller.

As shown in FIG. 5, a locking lever 41, which serves as a locking member, is disposed between the pair of arms 22 of the slider 14 and on the front side of the rear roller 16. The locking lever 41 constitutes a part of the sliding mechanism 17, which will be described later. The locking lever 41 is supported by the slider 14 swingably movable in the front-rear direction via the shaft 42. As shown in FIG. 16, the shaft 42 is press-fitted into the shaft hole 43 formed on the arm 22 and is bridged between the pair of arms 22.

Figure 17:
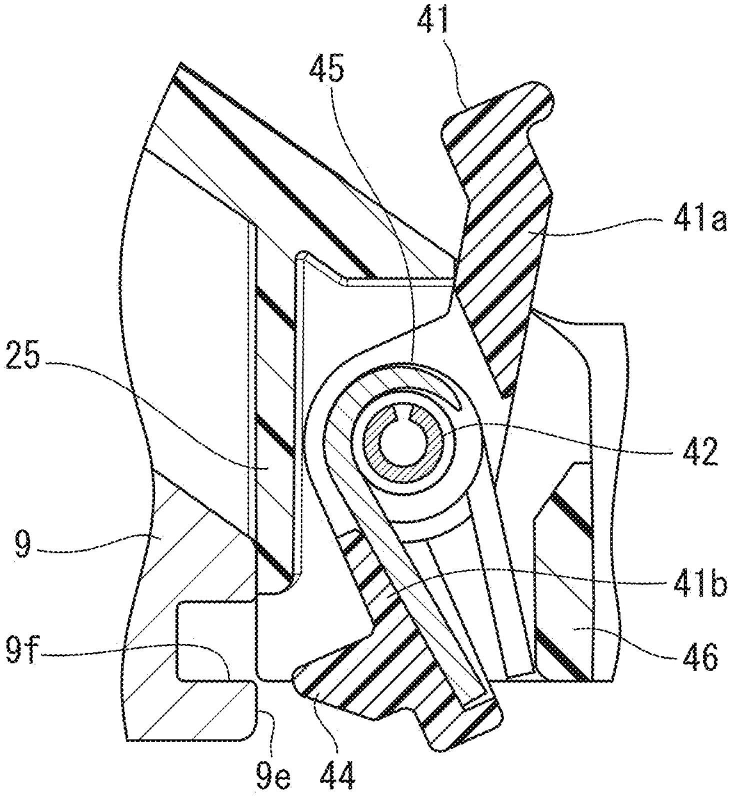
FIG. 17 shows a cross-sectional view showing a portion of the assist roller enlarged.

The locking lever 41 includes an operating portion 41*a* extending upwards of the shaft 42 and a locking portion 41*b* extending downwards of the shaft 42, as shown in FIGS. 8 and 9. The operating portion 41*a* (upper end) protrudes upward from the arm 22. The locking portion 41*b* extends along the vertical wall 25 of the slider 14 and protrudes downward from the vertical wall 25. A locking piece 44 (convex portion) protruding forward is provided at the lower end of the locking portion 41*b*. The locking piece 44 is inserted from the rear into the third groove 9*f* of the rail 9 when the locking portion 41*b* is extending in the up-down direction along the vertical wall 25. Furthermore, the locking piece 44 exits from the third groove 9*f* by the locking lever 41 swinging so that the locking portion 41*b* is moved rearward away from the vertical wall 25 as shown in FIG. 17.

A torsional coil spring 45 (spring member) is disposed in the center part of the locking lever 41 in the axial direction of the shaft 42. The torsional coil spring 45 biases the locking portion 41*b* forward (in the direction in which the locking piece 44 is inserted into the third groove 9*f*). One end of the coil spring 45 is pressed against the rear surface of the locking portion 41*b* and the other end of the coil spring 45 is pressed against the wall 46 on the front side of the arm 22 in a state where the shaft 42 is running through the coil spring 45.

The locking lever 41 is biased by the spring force of the torsional coil spring 45 so as to hold the locking portion 41*b* pressed against the vertical wall 25 in a natural state where the operating portion 41*a* is not operated. Hereafter, the position of the locking lever 41 in which the locking portion 41*b* presses against the vertical wall 25 is referred to as the "locked position".

By pushing the operating portion 41*a* forward against the spring force of the torsional coil spring 45, the locking lever 41 swingably moves about the shaft 42, and the locking portion 41*b* moves away from the vertical wall 25 rearward. The locking piece 44 exits the third groove 9*f* when the locking lever 41 swings as described above while the assist roller 13 is attached to the rail 9. Hereafter, the position of the locking lever 41 in a state where the locking piece 44 is out of the third groove 9*f* is referred to as the "unlocked position".

The third groove 9*f* of the rail 9, the holding portion 21 of the slider 14, the locking lever 41, and the torsional coil spring 45 constitute a sliding mechanism 17 that attaches the assist roller 13 to the rail 9 detachably and movably. In accordance with this sliding mechanism 17, the assist roller 13 is held so as not to be removable from the rail 9 by the locking lever 41 being positioned in the locked position as shown in FIG. 8. In this situation, the slider 14 slides along the rail 9, so that the assist roller 13 is movable along the rail 9 in the left-right direction.

Figure 18:
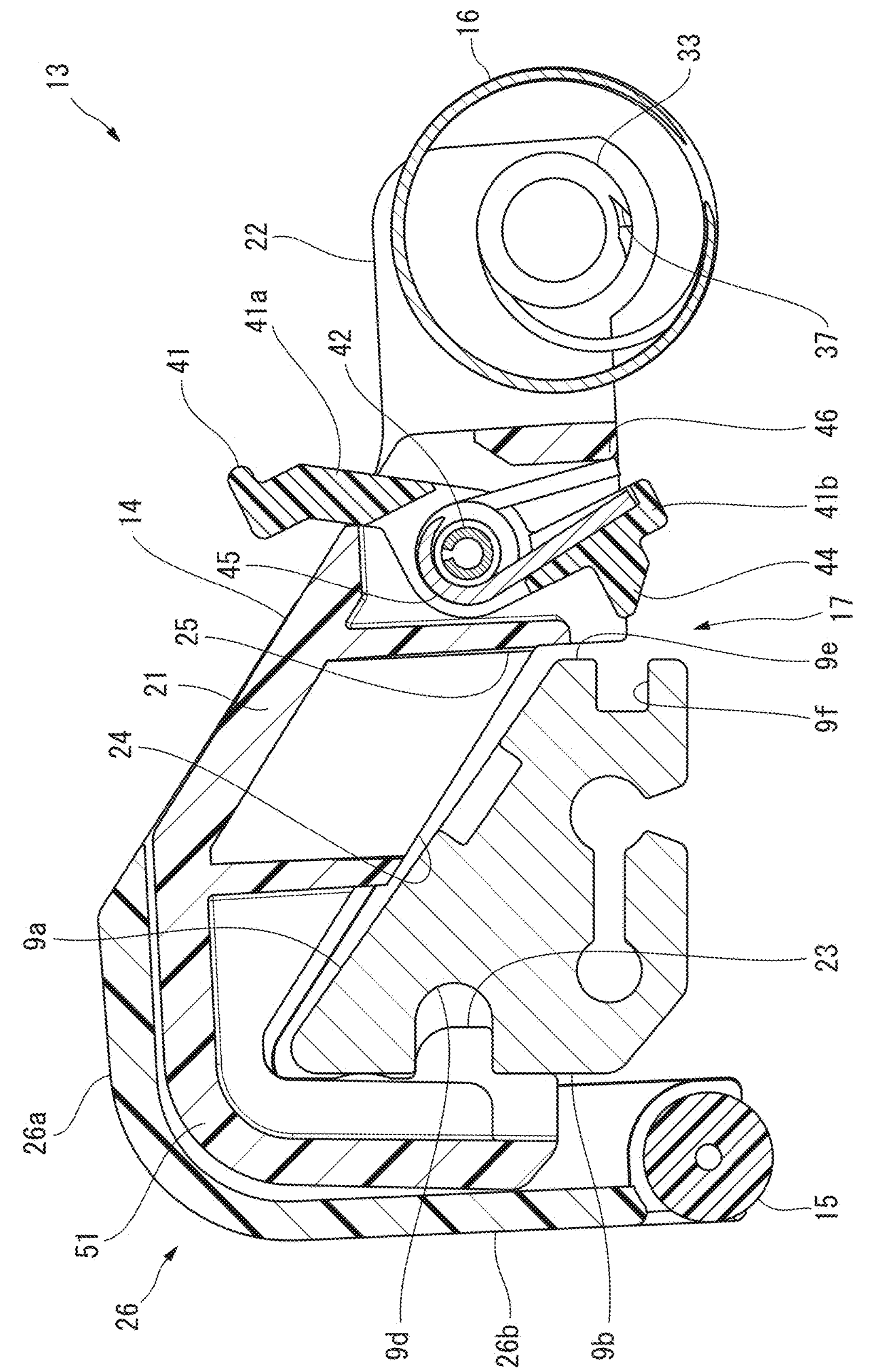
FIG. 18 shows a cross-sectional view showing a state where the slider of the assist roller is bent.

In order to disengage the assist roller 13 attached to the rail 9 from the rail 9, the operating portion 41*a* of the locking lever 41 is first pressed forward, and the locking lever 41 is swung and positioned in the unlocked position as shown in FIG. 17. Then, in this state, the rear end of the slider 14 is pulled upwards by holding the rear end by a hand, so that the slider 14 is bent such that the rear end is displaced upwards as shown in FIG. 18. At this time, the portion extending in the up-down direction at the front end of the slider 14 is not likely to deform because the protrusion 23 formed on the front end of the slider 14 engages the second groove 9*d* of the rail 9. As a result, the corner 51 of the curved slider 14 is elastically deformed such that the corner 51 is widened.

Figure 19:
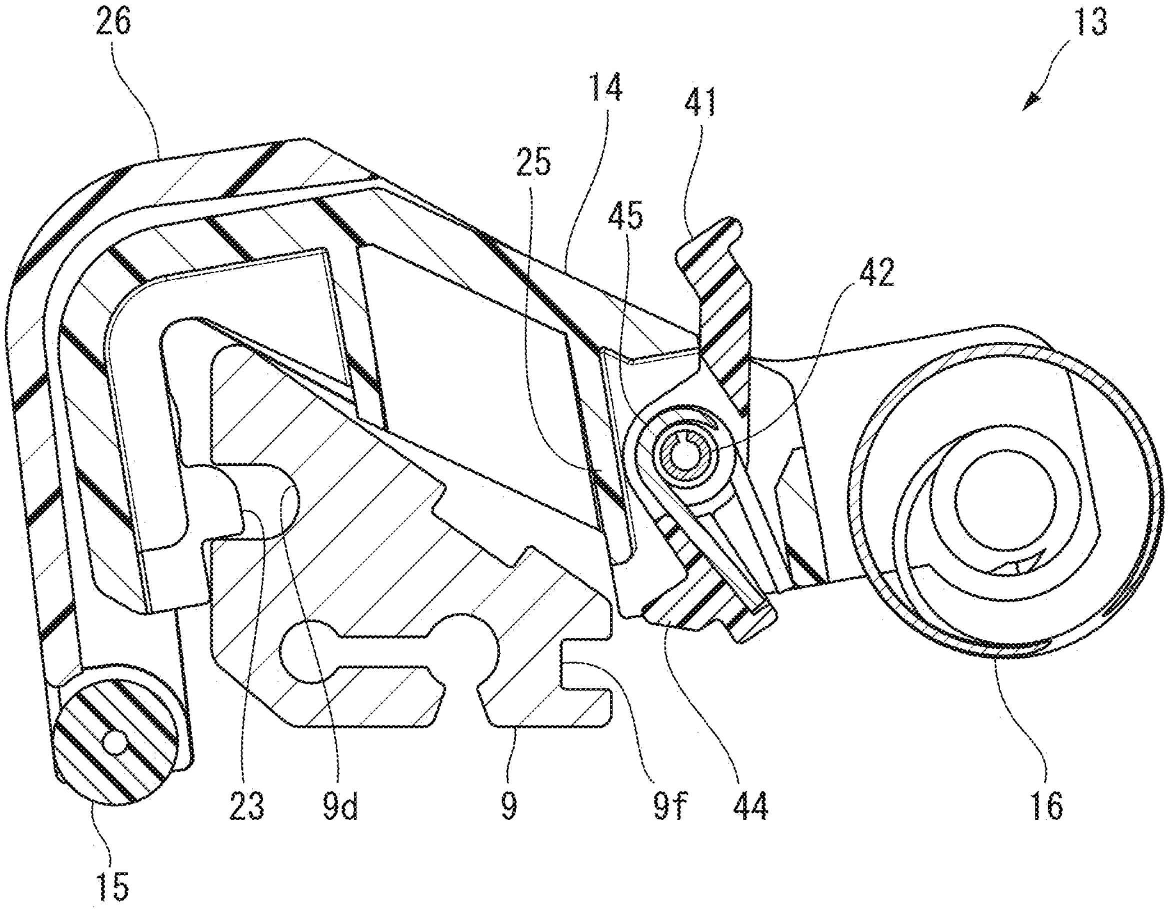
FIG. 19 shows a cross-sectional view showing a state where the assist roller is removed from the rail.

By moving the slider 14 forward in a state where the slider 14 is bent as shown in FIG. 18 and raising the rear end of the slider 14 further upwards, the engagement between the protrusion 23 and the second groove 9*d* can be cancelled as shown in FIG. 19, and the assist roller 13 can be removed from the rail 9 in front upwards.

When the assist roller 13 is attached to the rail 9, the protrusion 23 of the slider 14 is first engaged with the second groove 9*d* of the rail 9, and the rear end of the slider 14 is pushed down while the locking lever 41 is swung to the unlocked position. By operating in this way, the holding portion 21 of the slider 14 fits into the rail 9 from above. Thereafter, by releasing the locking lever 41 and causing the locking lever 41 to swing to the locking position by the spring force of the torsional coil spring 45, the locking piece 44 is inserted into the third groove 9*f* so that the assist roller 13 cannot be detached from the rail 9.

The assist roller 13 according to this embodiment is attachable to and detachable from the rail 9. Therefore, when a medium 2 with a narrow width is used, the assist roller 13 can be removed to avoid interference between the assist roller 13 and the first and second pinch roller units 7 and 8. Meanwhile, when a medium 2 with a wide width is used, the entire area of the medium 2 in the width direction can be pressed against the work stage 3 by adding an assist roller 13. Accordingly, according to this embodiment, it is possible to provide a plotter 1 in which the assist roller 13 does not interfere with the pinch roller 6, and in which the effect of pressing the medium 2 against the work stage 3 is sufficiently obtained.

The sliding mechanism 17 according to this embodiment includes: a third groove 9*f* which is formed on the rail 9 and which extends in the longitudinal direction of the rail 9; a holding portion 21 which is formed on the assist roller 13 and on which the rail 9 fits; a locking lever 41 (lock piece 44) which is swingably provided on the assist roller 13 and which enters and exits the third groove 9*f*, and a torsional coil spring 45 which biases the locking lever 41 (lock piece 44) toward a direction in which the locking lever 41 enters the third groove 9*f*. The assist roller 13 is held in a state where it is attached to the rail 9 by the locking lever 41 entering into the third groove 9*f*, and the assist roller 13 is caused to be detachable from the rail 9 by the locking lever 41 exiting the third groove 9*f*. It is possible to switch between a state where the assist roller 13 is removable and a state where it cannot be removed by the locking lever 41, and therefore it is possible to achieve a sliding mechanism 17 that makes the assist roller 13 attachable and removable inexpensively with a simple structure.

When viewed from above, the assist roller 13 according to this embodiment includes a slider 14 formed on a shape that traverses the rail 9 in the front-rear direction. The third groove 9*f* on the rail 9 is formed at the rear end of the rail 9. The locking lever 41 has a shape extending in the up-down direction. The upper end (operating portion 41*a*) of the locking lever 41 is configured to swingably move in the front-rear direction in a state where it protrudes upward from the slider 14. Provided on the lower end of the locking lever 41 is a locking piece 44 that enters and exits the third groove 9*f* as a result of the swing of the upper end.

Therefore, the assist roller 13 can be removed from the rail 9 by pushing the upper end of the locking lever 41 forward and lifting the assist roller 13 forward. Since the direction operating the locking lever 41 when the assist roller 13 is removed from the rail 9 and the direction of lifting the assist roller 13 are substantially the same, it is possible to carry out the operation of removing the assist roller 13 easily.

The assist roller 13 according to this embodiment includes a shaft 33 extending in the longitudinal direction of the rail 9 on the rear side of the rail 9. The rear roller 16 includes: a contact portion 16*a* formed to have a coil shape by a linear spring material 36; a pair of connecting portions 16*b* formed of spring materials 36 extending from both ends of the contact portion 16*a* toward a direction opposite to the contact portion 16*a*; and a pair of shaft portions 16*c* connected to the contact portion 16*a* via the pair of connecting portions 16*b*. The pair of shaft portions 16*c* are formed to have a shape of a ring located on the same axis as the contact portion 16*a* and are rotatably supported by the shaft 33. The contact portion 16*a* is displaced upward with respect to the pair of shaft portions 16*c* to cause the pair of connecting portions 16*b* to bend, and therefore the contact portion 16*a* is pressed against the medium 2 by the spring reaction force generated on the pair of connecting portions 16*b*. Accordingly, the medium 2 can be pressed by the spring force generated on the rear roller 16, and therefore there is no need for a spring member solely for pressing the rear roller 16 against the medium 2. Therefore, the number of parts can be reduced compared to using such a spring member.

The assist roller 13 according to this embodiment includes a pressing lever 26. The pressing lever 26 includes: a lateral plate 26*a* extending in the front-rear direction above the rail 9; and vertical plates 26*b* extending in the up-down direction from the ends of the lateral plate 26*a* toward the front of the rail 9. The pressing lever 26 is configured such that the vertical plate 26*b* can swingably move in the up-down direction. A front roller 15 for pressing the medium 2 against the work stage 3 is provided on the vertical plate 26*b*. Accordingly, the medium 2 can be pressed against the work stage 3 by the front roller 15 and the rear roller 16, and therefore the rise of the medium 2 can be suppressed even more reliably.

The pressing lever 26 and the front roller 15 are not essential for the assist roller 13.

An example of the cutting plotter 1 being applied to the present invention has been described in the embodiment described above. However, the present invention can also be applied to a pen plotter for drawing characters or pictures on a sheet-shaped medium 2, or other plotters. The plotter to which the present invention is applies includes a pen carriage for holding a pen in accordance with the function of the plotter.

APPENDIX

Hereafter, appendices relating to the present invention will be described.

Appendix 1 concerns a plotter comprising: a work stage on which a medium is placed; a feed mechanism configured to convey the medium on the work stage in a conveyance direction; a pen carriage configured to move above the work stage in a first direction which is orthogonal to the conveyance direction and which is parallel to a horizontal direction; a rail which is arranged upstream of the pen carriage in the conveyance direction and which extends in the first direction; and an assist roller including a rotating body configured to press the medium against the work stage, the assist roller configured to be attachable to and detachable from the rail and configured to be movable in the first direction when attached to the rail. The assist roller may be configured to be movable only in the first direction when attached to the rail.

The feed mechanism may include a drive roller extending in the first direction, and a plurality of pinch rollers configured to press the medium against the drive roller. The drive roller may be configured to rotate so as to convey the medium pressed by the plurality of pinch rollers in the conveyance direction.

The work stage may include an opening extending in the first direction. The drive roller may be arranged at under the work stage, and an upper portion of the drive roller may protrude from the opening to an upper surface of the work stage.

The opening may be arranged upstream of the pen carriage in the conveyance direction.

The assist roller may be arranged between the plurality of pinch rollers.

The plurality of pinch rollers may be supported by the rail. At least one of the plurality of pinch rollers may be supported by the rail movably in the first direction.

Appendix 2 concerns the plotter according to Appendix 1, wherein the assist roller includes a holding portion configured to hold the rail from above, an opening into which the rail is inserted is formed on the holding portion, and the holding portion is configured such that an opening length of the opening in the conveyance direction can be changed.

A side of the holding portion may have a substantially U shape.

The holding portion may be formed of an elastically deformable material. The holding portion may be formed of, for example, a plastic material.

The rotating body may include a first roller provided downstream of the rail in the conveyance direction. The rotary body may further include a second roller provided upstream of the rail in the conveyance direction. It should be noted that the second roller is not essential.

Appendix 3 concerns the plotter according to Appendix 1, wherein a groove extending in the longitudinal direction of the rail is formed on the rail, the assist roller comprises: a slider including a holding portion on which the rail fits; a locking member configured to swingably move so as to enter and exit the groove; and a spring configured to bias the locking member toward a direction in which the locking member enters the groove, wherein the assist roller is held attached to the rail as a result of the locking member entering the groove, and the assist roller can be detached from the rail as a result of the locking member exiting from the groove.

The locking member may be swingably supported by the slider.

Appendix 4 concerns the plotter according to Appendix 3, wherein the locking member has a shape extending in an up-down direction, an upper end of the locking member is configured to swingably move in the conveyance direction while the upper end protrudes upward from the slider, and a lower end of the locking member includes a convex portion configured to enter and exit the groove as a result of the swing of the upper end.

The slider may be formed so as to transverse the rail in the conveyance direction when viewed from above.

Appendix 5 concerns the plotter according to Appendix 3 or 4, wherein the groove is formed on an end surface downstream of the rail in the conveyance direction.

The groove may be formed on an end surface upstream of the rail in the conveyance direction.

Appendix 6 concerns the plotter according to any one of Appendices 1 to 5, wherein the assist roller includes a shaft extending in a longitudinal direction of the rail on a side downstream of the rail in the conveyance direction, the rotating body includes a first roller rotatably supported on the shaft, the first roller comprises: a contact portion formed in a coil shape by a linear spring material; a pair of connecting portions which is formed by the spring material and which extends from both ends of the contact portion in a direction away from the contact portion; and a pair of shaft portions connected to the contact portion via the pair of connecting portions, the pair of shaft portion formed to have a ring shape which is located on a same axis as the contact portion and being rotatably supported by the shaft, wherein the contact portion is pressed against the medium as a result of a spring reaction force generated on the pair of connecting portions by the contact portion being displaced upward with respect to the pair of shaft portions and the pair of connecting portions being bent.

Appendix 7 concerns the plotter according to any one of Appendices 1 to 6, wherein the assist roller includes a pressing lever including a lateral plate extending in the conveyance direction above the rail and a vertical plate extending in the up-down direction from an end of the lateral plate, the pressing lever is configured to be swingably movable such that the vertical plate moves in the up-down direction, and the rotating body includes a second roller which is rotatably provided on the lower end of the vertical plate and which is configured to press the medium against the work stage.

The vertical plate of the pressing lever may be arranged upstream of the rail in the conveyance direction.

The pressing lever may include a pair of side walls extending from both ends of the lateral plate in the first direction toward a direction opposite to the vertical plate. The pressing lever may be supported by the slider pivotably about one point on each of the pair of side walls.

The pressing lever may include a pair of shafts formed on opposite surfaces of the pair of side walls, and the pair of shafts may be configured to pivotably fit into a pair of shaft holes formed on the slider.

INCORPORATION BY REFERENCE

This application claims the benefit of foreign priority to Japanese Patent Application No. JP 2023-179456, filed Oct. 18, 2023, which is incorporated by reference in its entirety.

The invention claimed is:

1. A plotter comprising:

a work stage on which a medium is placed;

a feed mechanism configured to convey the medium on the work stage in a conveyance direction;

a pen carriage configured to move above the work stage in a first direction which is orthogonal to the conveyance direction and which is parallel to a horizontal direction;

a rail which is arranged upstream of the pen carriage in the conveyance direction and which extends in the first direction; and an assist roller including a rotating body configured to press the medium against the work stage, the assist roller configured to be attachable to and detachable from the rail and configured to be movable in the first direction when attached to the rail, wherein a groove extending in the longitudinal direction of the rail is formed on the rail, the assist roller comprises:

a slider including a holding portion on which the rail fits;

a locking member configured to swingably move so as to enter and exit the groove; and a spring configured to bias the locking member toward a direction in which the locking member enters the groove, and wherein the assist roller is held attached to the rail as a result of the locking member entering the groove, and the assist roller can be detached from the rail as a result of the locking member exiting from the groove.

2. The plotter according to claim 1, wherein the assist roller includes a holding portion configured to hold the rail from above, an opening into which the rail is inserted is formed on the holding portion, and the holding portion is configured such that an opening length of the opening in the conveyance direction can be changed.

3. The plotter according to claim 1, wherein the locking member has a shape extending in an up-down direction, an upper end of the locking member is configured to swingably move in the conveyance direction while the upper end protrudes upward from the slider, and a lower end of the locking member includes a convex portion configured to enter and exit the groove as a result of the swing of the upper end.

4. The plotter according to claim 1, wherein the groove is formed on an end surface downstream of the rail in the conveyance direction.

5. A plotter comprising, a work stage on which a medium is placed;

a feed mechanism configured to convey the medium on the work stage in a conveyance direction;

a pen carriage configured to move above the work stage in a first direction which is orthogonal to the conveyance direction and which is parallel to a horizontal direction;

a rail which is arranged upstream of the pen carriage in the conveyance direction and which extends in the first direction; and an assist roller including a rotating body configured to press the medium against the work stage, the assist roller configured to be attachable to and detachable from the rail and configured to be movable in the first direction when attached to the rail, wherein the assist roller includes a shaft extending in a longitudinal direction of the rail on a side downstream of the rail in the conveyance direction, the rotating body includes a first roller rotatably supported on the shaft, the first roller comprises:

a contact portion formed in a coil shape by a linear spring material;

a pair of connecting portions which is formed by the spring material and which extends from both ends of the contact portion in a direction away from the contact portion; and a pair of shaft portions connected to the contact portion via the pair of connecting portions, the pair of shaft portion formed to have a ring shape which is located on a same axis as the contact portion and being rotatably supported by the shaft, and wherein the contact portion is pressed against the medium as a result of a spring reaction force generated on the pair of connecting portions by the contact portion being displaced upward with respect to the pair of shaft portions and the pair of connecting portions being bent.

6. A plotter comprising:

a work stage on which a medium is placed;

a feed mechanism configured to convey the medium on the work stage in a conveyance direction;

a pen carriage configured to move above the work stage in a first direction which is orthogonal to the conveyance direction and which is parallel to a horizontal direction;

a rail which is arranged upstream of the pen carriage in the conveyance direction and which extends in the first direction; and an assist roller including a rotating body configured to press the medium against the work stage, the assist roller configured to be attachable to and detachable from the rail and configured to be movable in the first direction when attached to the rail, wherein the assist roller includes a pressing lever including a lateral plate extending in the conveyance direction above the rail and a vertical plate extending in the up-down direction from an end of the lateral plate, the pressing lever is configured to be swingably movable such that the vertical plate moves in the up-down direction, and the rotating body includes a second roller which is rotatably provided on the lower end of the vertical plate and which is configured to press the medium against the work stage.

* * * * *